United States Patent [19]

Students

[11] 3,711,950
[45] Jan. 23, 1973

[54] REMOVABLE HANDLES FOR SHEARS OR THE LIKE

[75] Inventor: John J. Students, Roselle Park, N.J.
[73] Assignee: J. Wiss and Sons Co., Newark, N.J.
[22] Filed: April 13, 1970
[21] Appl. No.: 27,660

[52] U.S. Cl. ................................................. 30/341
[51] Int. Cl. .............................................. B25g 3/02
[58] Field of Search........ 30/254, 340, 341, 343, 257, 30/258, 261

[56] References Cited

UNITED STATES PATENTS

| | | | |
|---|---|---|---|
| 444,035 | 1/1891 | Wyatt | 30/341 X |
| 2,520,808 | 8/1950 | Miller | 30/341 X |
| 2,627,656 | 2/1953 | Richartz | 30/254 |
| 2,931,100 | 4/1960 | Wertepny | 30/258 |
| 3,398,451 | 8/1968 | Angguist | 30/261 X |

FOREIGN PATENTS OR APPLICATIONS

| | | | |
|---|---|---|---|
| 640,754 | 7/1950 | Great Britain | 30/341 |
| 542,489 | 4/1956 | Italy | 30/254 |

*Primary Examiner*—Robert C. Riordon
*Assistant Examiner*—J. C. Peters
*Attorney*—Sparrow and Sparrow

[57] ABSTRACT

The shears or similar implements have removable handles, preferably made of molded plastic, on curvilinearly shaped shanks with tangs extending with continuously decreasing thickness past the area where the main finger pressure of the operation of the shears occurs. The method of molding the handles uses retractable cores which have the same curvilinear shape with continuously decreasing section as the tangs of the shears' shanks.

4 Claims, 6 Drawing Figures

PATENTED JAN 23 1973  3,711,950
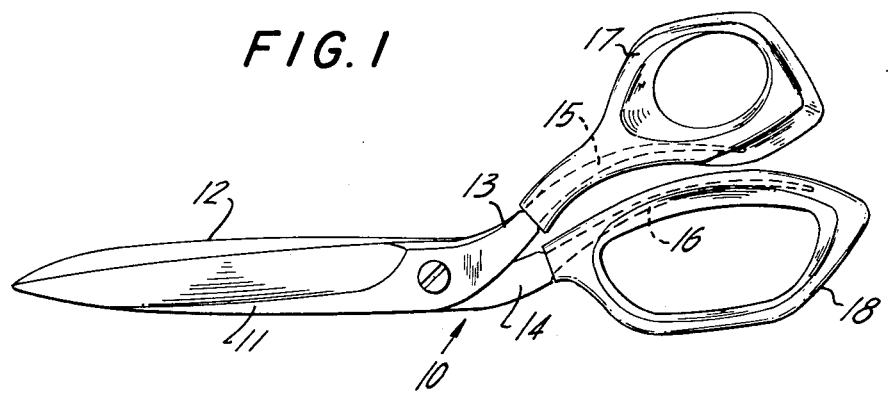
FIG.1
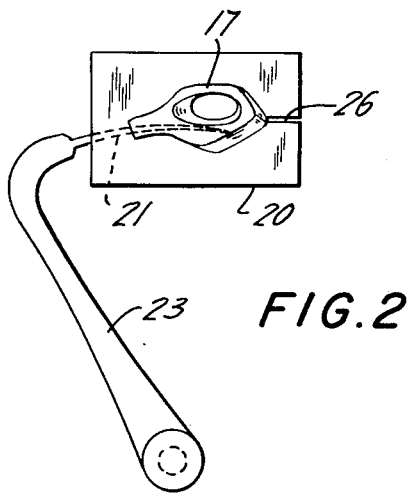
FIG.2
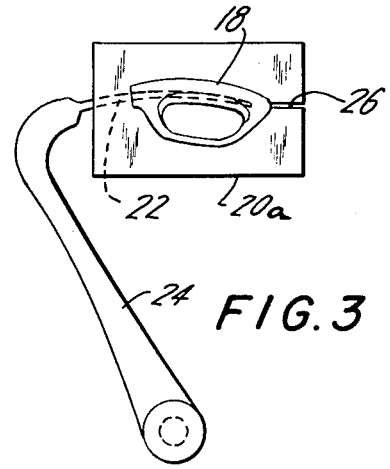
FIG.3
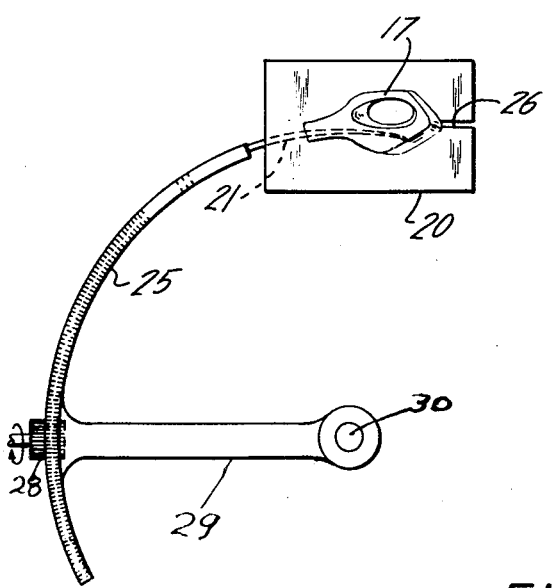
FIG.4
FIG.5
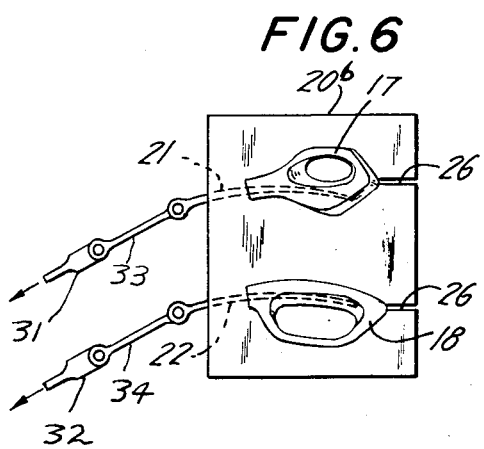
FIG.6
INVENTOR
JOHN J. STUDENTS
BY
SPARROW AND SPARROW
ATTORNEYS

REMOVABLE HANDLES FOR SHEARS OR THE LIKE

BACKGROUND OF THE INVENTION

The invention relates to implements more particularly to cutting tools such as shears, scissors or the like having removable handles with particular reference to such handles and to the method of making the same.

Providing the shanks of shears and scissors with plastic, wooden or die-cast handles is not new per se. One of the most difficult and costly operations in manufacturing of shears is forging and finishing of the handles. Forging dies require extensive locks, or changes of plan, in special areas for accommodating the reversing angles required for a good hand fit. Furthermore, belting or milling for removing the inevitable flash or fins is an expensive operation. For many years, various makers have produced and sold shears, which had forged blades without handles, to which separate handles of plastic, wood, aluminum or zinc had been fitted by a further production operation. In many cases the handles fitted in this manner were placed over stub shanks, but heavy use caused the handles to loosen or to break. In some instances manufacturers spot-welded a wire bow to the blade shank and then molded the handles over the wire by insert molding. This is an expensive procedure requiring the placing of the blades with the bows into the die before closing the latter, thus uneconomically lengthening the molding cycle. The present invention solves this problem.

SUMMARY

The invention consists in such novel features, construction arrangements, combinations of parts and improvements as may be shown and described in combination with the apparatus herein disclosed by way of example only and as illustrative of preferred embodiments. The development of hand-operated cutting tools, such as shears, scissors, trimmers and the like devices, having separate handles, makes it necessary to provide a stronger shank. In shears, the blades are usually forged with straight shanks on them. Handles are afterwards placed over the shanks. The improvement of this construction, based on diligent research, leads to the running of the steel stub shank past the area where the pressure of the hand is exerted in order to obtain the necessary strength to resist heavy usage. Furthermore, the tangs, which are the extension of the shanks, are curvilinearly extended with continuously decreasing cross-sectional dimensions. This construction presents the correct blade-to-handle relationship and also interposes a couple force to resist turning movements, thus preventing the handles from loosening and turning. In addition, the curvilinear shape of the tangs gives rise to a novel and very useful method of molding the handles.

Objects and advantages of the invention will be set forth in part hereafter and in part will be obvious herefrom or may be learned by practicing the invention, the same being realized and attained by means of the instrumentalities and combinations pointed out in the appended claims.

It is an object of the present invention to provide shears, scissors or the like cutting tools with curvilinear-shaped shanks having continuous decreasing cross sectional dimensions toward the free end of the shank.

Another object of the present invention is to provide shanks of cutting tools with the proper offset relationship between the bow position and the cutting line and with maximum strength, by providing tangs with an extended curvilinear length past the area of the maximum operational pressure exerted by the fingers of the hand.

A further object of the present invention is to provide tangs with curvilinear shape to prevent the twisting of the handles by presenting a widely spaced couple to resist the turning forces.

Yet another object of the present invention is to provide a novel method of molding the separate handles of cutting tools by coring the curvilinear form into the molded handles.

Various further and more specific purposes, features and advantages will clearly appear from the detailed description given below taken in connection with the accompanying drawing which forms part of this specification and illustrates merely by way of example some embodiments of the device of the invention.

BRIEF DESCRIPTION OF THE DRAWING

In the following description and in the claims, parts will be identified by specific names for convenience, but such names are intended to be as generic in their application to similar parts as the art will permit. Like reference characters denote like parts in the several figures of the drawing, in which FIG. 1 illustrates a shears with plastic handles;

FIG. 2 illustrates the method of molding the upper handle with the curvilinear form cored in the mold;

FIG. 3 illustrates the method of molding the lower handle with the curvilinear form cored in the mold;

FIG. 4 shows another version of the molding of the handle with the curvilinear form cored therein;

FIG. 5 is a detail of the mechanism for extracting the curvilinear core from the mold of the handle;

FIG. 6 illustrates the simplest mode of the method of molding of the handles with curvilinear cores.

DESCRIPTION OF THE PREFERRED EMBODIMENTS

Referring now in more detail to the drawing illustrating preferred embodiments by which the invention may be realized, there is illustrated in FIG. 1 typical shears 10 with an upper blade 11 and a lower blade 12. Blades 11 and 12 have shanks 13 and 14, respectively, from which extend tangs 15 and 16, respectively. Blades 11,12, shanks 13,14 and tangs 15,16 are integrally formed. The handles 17, 18 are pushed over tangs 15,16 respectively, so that tangs 15,16 extend into handles 17,18 beyond the area of operating pressure exerted by the fingers of the user, as shown in FIG. 1. The cross-sectional dimensions of tangs 15,16 decrease continuously toward the tips thereof. Thus, handles 17,18 are prevented from loosening and turning on tangs 15,16 by reason of the curvilinear shape thereof. It is apparent that this structure imparts unconventional strength not heretofore found in shears with plastic handles.

The methods of making the handles are illustrated in FIGS. 2,3,4, and 6. Referring to FIGS. 2 and 3, the curvilinearly shaped cores 21,22 are respectively attached to rotatable arms 23 and 24 and are rotated into handle molds 20 and 20a, respectively. Following the closing of molds 20 and 20a, suitable material such as plastic or metal is injected through gates 26. Prior to final hardening and cooling of the material, cores 21, 22 are respectively drawn from molds 20 and 20a by counter-clockwise rotation of arms 23 and 24 respectively. Following the final hardening of the handles, molds 20 and 20a are opened, and the finished handles 17,18 are removed and are ready for assembly over tangs 15,16 respectively, which have the same curvilinear shape as cores 21,22. No further processing or machinery is necessary.

Referring to FIGS. 4 and 5, the method disclosed therein varies somewhat from the previous method. Arcuately shaped rack 25 is provided with curvilinear shaped core 21. The method of molding is the same as the previous method. However, mechanical means are provided to withdraw core 21 from the molded handle. A pinion gear 28 drives rack 25 which is supported by rack arm 29 rotatable about pivot 30.

In FIG. 6, the core inserting, molding and withdrawing operation may be manually performed by a linear motion instead of a rotary motion. In this method, cores 21 and 22 are pivotally attached respectively to arms 31 and 32 through respective links 33 and 34. Thus, the cores are articulatedly linked to the arms 31, 32 in lieu of being rigidly attached thereto. Both handles may be molded in a double cavity mold 20b.

Any suitable means may be provided to retain the handles on the shanks, such as small barbs stamped in the metal shanks engaging the handle material and/or by cement, such as epoxy.

While the invention has been described and illustrated with respect to certain preferred examples which give satisfactory results, it will be understood by those skilled in the art after understanding the principle of the invention, that various other changes and modifications may be made without departing from the spirit of the invention.

What is claimed is:

1. Hand-operated cutting tool comprising a pair of cooperating blades, curvilinear shanks extending from said blades, curvilinear tangs extending from said shanks, said tangs having substantial curvature and extending beyond the area of maximum operating pressure, and separate substantially rigid handles having complementary curvilinear cavities, said cavities having substantially rigid walls within said handles, the curvature of said rigid cavities conforming substantially to the curvature of said tangs, said handles being assembled to said tangs with said tangs fitting in said cavities, the rigidity of said curvilinear cavities inhibiting turning and withdrawal of said handles relative to said tangs.

2. Hand-operated cutting tool according to claim 1, said curvilinear tangs having continuously decreasing section dimensions toward the free ends thereof.

3. Hand-operated cutting tool according to claim 1, said handles being made of plastic.

4. Hand-operated cutting tool according to claim 1, said handles being made of metal.

* * * * *